US008883106B2

(12) United States Patent
Buschmann et al.

(10) Patent No.: US 8,883,106 B2
(45) Date of Patent: Nov. 11, 2014

(54) METHOD AND A DEVICE FOR REMOVING NITROGEN OXIDES AND SULPHUR TRIOXIDE FROM A PROCESS GAS

(75) Inventors: John Buschmann, Knoxville, TN (US); Lawrence Joseph Czarnecki, Knoxville, TN (US); Mou Jian, Knoxville, TN (US); Frederic Zenon Kozak, Knoxville, TN (US)

(73) Assignee: ALSTOM Technology Ltd, Baden (CH)

( * ) Notice: Subject to any disclaimer, the term of this patent is extended or adjusted under 35 U.S.C. 154(b) by 198 days.

(21) Appl. No.: 12/205,135

(22) Filed: Sep. 5, 2008

(65) Prior Publication Data

US 2010/0061906 A1    Mar. 11, 2010

(51) Int. Cl.
*B01D 53/60* (2006.01)
*B01J 23/92* (2006.01)
(Continued)

(52) U.S. Cl.
CPC ............. *B01D 53/8631* (2013.01); *B01J 23/92* (2013.01); *F23J 15/006* (2013.01); *B01D 2255/9207* (2013.01); *B01D 2251/2062* (2013.01); *B01D 2251/2067* (2013.01); *F23J 2215/10* (2013.01); *F23J 15/04* (2013.01); *B01D 53/505* (2013.01); *F23J 2215/20* (2013.01); *B01D 2251/404* (2013.01); *B01D 2251/604* (2013.01); *B01D 53/8637* (2013.01); *B03C 3/017* (2013.01); *B01D 2255/9045* (2013.01); *B01D 2255/20776* (2013.01); *B01D 2255/20707* (2013.01); *F23J 2217/102* (2013.01); *F23J 2219/10* (2013.01); *B01D 53/77* (2013.01); *B01D 53/96* (2013.01); *B01D 2259/80* (2013.01)
USPC .................. 423/239.1; 423/242.1; 423/237; 422/177

(58) Field of Classification Search
CPC .......... B01D 53/8631; B01D 53/8637; B01D 53/96; B01D 53/505; F23J 15/006; F23J 15/04; F23J 2219/10; F23J 2215/10; F23J 2215/20

USPC ................. 423/239.1, 242.1, 237; 422/177
See application file for complete search history.

(56) References Cited

U.S. PATENT DOCUMENTS 4,258,020 A    3/1981   Ginger
5,288,303 A *  2/1994   Woracek et al. .............. 95/2
(Continued)

FOREIGN PATENT DOCUMENTS

EP        1 676 626 A1     7/2006
JP        2002-320863 A   11/2002
WO        WO 99/40299      8/1999

OTHER PUBLICATIONS

PCT International Search Report and the Written Opinion of the International Searching Authority dated Nov. 19, 2009—(PCT/US2009/053663).

*Primary Examiner* — Rebecca Lee
(74) *Attorney, Agent, or Firm* — Rita D. Vacca (57) ABSTRACT

A catalytic reactor (16) is provided for purposes of effecting therewith the removal of nitrogen oxides from a process gas (F) that includes at least two catalyst bed segments (48, 50, 52), each of which is provided with a closing device (60, 62, 64). The catalytic reactor (16) is operative for causing said process gas (F) to flow through a first catalyst bed segment (48). Said process gas (F) is at a first temperature at which the sulphur trioxide that is entrained in said hot process gas is at least partially precipitated out on to the catalytic material that said first catalyst bed segment (48) embodies. Periodically said closing device (60) is operated in order to thereby isolate said first bed segment (48) from the flow therethrough of said hot process gas (F). A regeneration system (34, 36, 38) is also provided that is operative for purposes of causing a regenerating gas to flow through the first bed segment (48). In addition, a sulphur trioxide removal device (20) is provided, which is separate from said catalytic reactor (16), and which is operative for purposes of effecting therewith the removal of the sulphur trioxide from said regenerating gas.

9 Claims, 4 Drawing Sheets

(51) Int. Cl.
- *F23J 15/00* (2006.01)
- *F23J 15/04* (2006.01)
- *B01D 53/86* (2006.01)
- *B03C 3/017* (2006.01)
- *B01D 53/96* (2006.01)
- *B01D 53/50* (2006.01)
- *B01D 53/77* (2006.01)

(56) References Cited

U.S. PATENT DOCUMENTS

| | | | |
|---|---|---|---|
| 5,458,861 A | | 10/1995 | Buchanan et al. |
| 5,514,351 A | | 5/1996 | Buchanan et al. |
| 5,762,885 A | * | 6/1998 | Debbage et al. .............. 422/171 |
| 6,153,168 A | * | 11/2000 | Seitz et al. ................... 423/522 |

\* cited by examiner

METHOD AND A DEVICE FOR REMOVING NITROGEN OXIDES AND SULPHUR TRIOXIDE FROM A PROCESS GAS

FIELD OF THE INVENTION

The present invention relates to a method of removing, at least partially, nitrogen oxides from a hot process gas through the use of a catalytic reactor that embodies catalytically active material, and wherein said catalytic reactor includes a catalyst bed comprising at least two catalyst bed segments that are arranged in parallel relation with respect to the direction of flow of the hot process gas, each of said at least two catalyst bed segments being provided with a closing device, such that each of said at least two catalyst bed segments can be individually isolated from the flow of the hot process gas.

The present invention further relates to a gas cleaning system which is operative for removing, at least partially, nitrogen oxides from a hot process gas.

BACKGROUND OF THE INVENTION

During the combustion of a fuel, such as coal, oil, peat, waste, etc., in a combustion plant, such as a power plant, a hot process gas is generated, and such hot process gas contains, among other components, nitrogen oxides, usually denoted as NOx, and sulphur oxides, usually denoted as SOx. The nitrogen oxides are mainly comprised of nitrogen monoxide, denoted as NO, and nitrogen dioxide, denoted as $NO_2$, and the sulphur dioxides are mainly comprised of sulphur dioxide, denoted as $SO_2$, and sulphur trioxide, denoted as $SO_3$, the amount of sulphur trioxide, $SO_3$, normally constituting less than 5% of the total amount of SOx. The removal of NOx is usually accomplished through the use of a so-called Selective Catalytic Reduction (SCR) process. In accordance with such a process, NOx is reduced by means of ammonia gas, $NH_3$, to form nitrogen gas, $N_2$, in the presence of a catalytically active material. Such a catalytically active material commonly comprises metal oxides, such as, by way of exemplification, vanadium pentoxide, denoted as $V_2O_5$, and tungsten trioxide, denoted as $WO_3$.

A problem associated with the use of many of such catalytically active materials is that they after a period of time become contaminated by deposits of sulphur trioxide, $SO_3$, thereon that tend to form ammonium sulphates, which results in a decrease in the nitrogen oxide removal efficiency of these catalytically active materials. The normal procedure that is employed for purposes of overcoming such problems is to operate a reactor containing such catalytically active material at a rather high temperature, usually above 300° C., in an attempt to prevent the sulphur trioxide, $SO_3$, from precipitating out on to the catalytically active material.

In U.S. Pat. No. 5,762,885 there is described an oxidation catalyst absorber, which embodies a number of catalyst segments arranged in parallel relation and comprising platinum or palladium. Each of these catalyst segments is provided with two louvers, such that each one of the respective catalyst segments can be "closed" off insofar as the process gas that is to be cleaned is concerned. Moreover, the catalyst segments that are closed off can be regenerated through the use of a regenerating gas that contains hydrogen gas, the latter being operative to remove pollutants from the catalytic material embodied by such catalyst segments that are closed off. After being spent, such regenerating gas is then recycled to the reactor, where the spent regenerating gas is mixed with the process gas at a point located upstream of the catalyst bed.

While a catalyst absorber such as that described in U.S. Pat. No. 5,762,885 might be deemed to be effective for purposes of effecting the cleaning of a process gas that is generated in a natural gas fired turbine power plant, wherein the concentration of SOx in the process gas is very low, i.e., generally lower than 1 ppm, such a catalyst absorber is not suitable for cleaning process gas, e.g., flue gases, in which the concentration of SOx is higher than about 5 ppm. In a process gas that is generated during the combustion of coal or oil, or during the incineration of waste, the concentration of SOx in such a process gas is often in the range of 10 to 5000 ppm. Furthermore, the type of catalyst, which is employed, that is, an oxidation catalyst that contains noble metals like platinum or palladium, necessitates that there only be an extremely low concentration of catalyst pollutants, such as, by way of exemplification, mercury, lead and other heavy metals, in the hot process gas. Such a requirement restricts the use of the reactor to which U.S. Pat. No. 5,762,885 is directed to so-called "clean fuels", such as natural gas. For plants in which coal, oil, peat, waste, etc, are combusted the reactor to which U.S. Pat. No. 5,762,885 is directed would not be capable of providing an acceptable level of nitrogen oxide removal efficiency.

SUMMARY OF THE INVENTION

An object of the present invention is to provide a method of cleaning a hot process gas, which method is effective for removing NOx and SOx, and in particular sulphur trioxide, $SO_3$, from the hot process gas both when the hot process gas contains high concentrations of SOx and when the hot process gas contains low concentrations of SOx.

This object is achieved by means of a method of removing, at least partially, nitrogen oxide from a hot process gas through the use of a catalytic reactor that embodies catalytically active material, and wherein said catalytic reactor includes a catalyst bed comprising at least two catalyst bed segments that are suitably arranged in parallel relation with respect to the direction of flow of the process gas, each of said at least two catalyst bed segments being provided with a closing device, such that each of said at least two catalyst bed segments can be isolated from the flow of the hot process gas, said method being characterized in that the steps thereof comprise the following:

passing said hot process gas through at least a first bed segment of said at least two catalyst bed segments, wherein said hot process gas is at a first temperature at which the sulphur trioxide, $SO_3$, that is entrained in the hot process gas is at least partially precipitated on to the catalytic material that the first bed segment embodies, periodically operating the closing device of said first bed segment in order to thereby isolate said first bed segment from the flow of hot process gas, while at least one second bed segment of said at least two catalyst bed segments remains operative for purposes of removing from said hot process gas the sulphur trioxide, $SO_3$, and the nitrogen oxide that is entrained therein, causing a regenerating gas to flow through said first bed segment when said first bed segment is isolated from the flow of hot process gas, and then causing said regenerating gas, after said regenerating gas has flowed through said first bed segment, to flow through a sulphur trioxide, $SO_3$, removal device that is separate from said catalytic reactor.

An advantage of this method of the present invention is that the catalyst bed is designed to be operative for purposes of removing both the nitrogen oxides and the sulphur trioxide, $SO_3$, that are entrained in the process gas. This is accomplished by virtue of the sulphur trioxide, $SO_3$, being permitted to condense on to the catalytic material that the catalyst bed embodies. Contrary to the method of the present invention, the methods of the prior art are characterized by the fact that they are focused on avoiding the precipitation of the sulphur trioxide, $SO_3$, that is entrained in the process gas on to the catalytic material that the catalyst bed embodies, since such precipitation of such sulphur trioxide, $SO_3$, thereon results in a reduction in the efficiency that is capable of being realized with the catalytic material.

In accordance with the method of the present invention, the catalyst bed segments are regenerated during the normal operation of the catalytic reactor, such that no shut-down or interruption of the operation of the catalytic reactor is therefore required. To this end, the regenerating gas after flowing through the catalyst bed segments is made to flow from the catalytic reactor to a separate device, which is operative for purposes of capturing therein the sulphur trioxide, $SO_3$, that is entrained in the regenerating gas. By virtue of the use of such a process the sulphur trioxide is first effectively removed from the process gas through the operation of the catalytic reactor, and is then removed from the catalytic reactor, by virtue of the flow therethrough of regenerating gas, and is finally disposed of in the sulphur trioxide, $SO_3$, removal device by virtue of the operation thereof, with the sulphur trioxide, $SO_3$, removal device being located separately from the catalytic reactor.

According to one embodiment of the method of the present invention, said regenerating gas is at a second temperature, which is higher than said first temperature. An advantage of this embodiment of the present invention is that a regenerating gas that is at a second temperature, which is higher than the first temperature, the latter temperature being the temperature of the hot process gas, causes the regeneration of the catalyst bed segments to be more effective and to occur quicker.

According to one embodiment of the method of the present invention said first temperature is in the range of 180-300° C., and said second temperature is at least 310° C. Said first temperature, being the temperature of the process gas passing through the catalytic reactor, which is in the range of 180-300° C. has been found to be effective since such a temperature provides for both an effective reduction of nitrogen oxides, and an effective condensation of the sulphur trioxide, $SO_3$, on to the catalytic material that the catalyst bed segments embody. Said second temperature, being the temperature of the regenerating gas, of at least 310° C. has been found to provide for an efficient evaporation of sulphur trioxide, $SO_3$, from the catalyst material that the catalyst bed segments embody. Preferably, in accordance with the method of the present invention said second temperature should be less than about 400° C., because temperatures higher than this increases the mechanical strain both on the mechanical components and on the catalytic material, and increases the energy costs as well.

According to one embodiment of the method of the present invention, said sulphur trioxide, $SO_3$, removal device preferably is selected from the group of devices that encompasses, by way of exemplification, wet scrubbers, dry scrubbers, fabric filters, and electrostatic precipitators. All of these devices are commonly utilized in gas cleaning systems, and are all suitable for purposes of effecting therewith the final disposal of sulphur trioxide, $SO_3$, which has been removed from the catalytic reactor by virtue of the flow therethrough of the regenerating gas.

According to one embodiment of the method of the present invention, said sulphur trioxide, $SO_3$, removal device is located at a point downstream of the catalytic reactor with respect to the direction of flow of the hot process gas, such as to be operative for purposes of removing from the hot process gas and from the regenerating gas the sulphur species that may be entrained therein. An advantage of this embodiment of the method of the present invention is that the sulphur trioxide, $SO_3$, removal device is operative to perform the dual purpose of removing the sulphur dioxide from the hot process gas, and of capturing as well the sulphur trioxide, $SO_3$, that has been removed by operation of the regenerating gas. As a consequence thereof, this reduces both the investment and maintenance costs that are associated with the use of the gas cleaning system.

According to one embodiment of the method of the present invention, said regenerating gas is cooled after having been passed through said first bed segment and before said regenerating gas has been made to flow through said sulphur trioxide, $SO_3$, removal device. An advantage of this embodiment of the present invention is that the sulphur trioxide, $SO_3$, is at least partially condensed to form a liquid solution, which makes it easier to handle the sulphur trioxide, $SO_3$, during the further processing thereof.

According to one embodiment of the method of the present invention, said regenerating gas is caused, after said regenerating gas has been passed through said first bed segment, to flow through a sulphur trioxide, $SO_3$, removal device whereby at least a portion of said regenerating gas is mixed with an absorption medium that is being circulated in said sulphur trioxide, $SO_3$, removal device for the purpose of effecting as a result thereof the removal of the sulphur dioxide from said hot process gas. An advantage of this embodiment of the method of the present invention is that said sulphur trioxide, $SO_3$, is able to react directly with the absorption medium so as to thereby form a product, such as gypsum, which is easy both to handle and to dispose of.

According to one embodiment of the method of the present invention, said regenerating gas preferably is selected from the group of gases that encompasses, by way of exemplification, steam, air, nitrogen, flue gas, and mixtures thereof. An advantage derived from the utilization of such gases is that such gases are often readily available at a combustion plant, and are so available thereat at a reasonable cost. Furthermore, such gases are non-combustible, and therefore are easily handled.

A further object of the present invention is to provide a gas cleaning system, which is effective for purposes of removing from a hot process gas both NOx and SOx, and in particular sulphur trioxide, $SO_3$, therefrom both when said hot process gas has entrained therein high concentrations as well as low concentrations of SOx.

Such an object is achieved in accordance with the present invention through a gas cleaning system that is adapted for purposes of removing, at least partially, nitrogen oxides from a hot process gas, said gas cleaning system includes a catalytic reactor embodying catalytically active material, said catalytic reactor in turn includes a catalyst bed comprising at least two catalyst bed segments that are suitably arranged in parallel relation with respect to the direction of flow of the hot process gas, with each of said at least two catalyst bed segments having a closing device associated therewith, such that each of said at least two catalyst bed segments can be individually isolated from the flow of the hot process gas, the gas cleaning system in accordance with the present invention being characterized in that said catalytic reactor is designed to be operative for purposes of causing said hot process gas to flow through at least a first bed segment of said at least two catalyst bed segments, and with said hot process gas being at a first temperature at which sulphur trioxide, $SO_3$, entrained in the hot process gas is at least partially precipitated on to the catalytic material that the first bed segment embodies, and for periodically operating said closing device to thereby isolate said first bed segment from the flow of hot process gas, while at least one second bed segment of said at least two catalyst bed segments remains operative for purposes of removing from said hot process gas the sulphur trioxide, $SO_3$, and the nitrogen oxide that is entrained therein, said gas cleaning system further comprises a regeneration system, which is designed to be operative for purposes of causing a regenerating gas to flow through said first bed segment when said first bed segment is isolated from the flow of hot process gas, as well as a sulphur trioxide, $SO_3$, removal device that is separate from said catalytic reactor and is designed to be operative for purposes of effecting therewith the removal from said regenerating gas of the sulphur trioxide, $SO_3$, that is entrained therein after said regenerating gas has flowed through said first bed segment.

An advantage of the gas cleaning system of the present invention is that the catalytic reactor is designed to be operative for purposes of effectively removing from the process gas both the nitrogen oxides and the sulphur trioxide, $SO_3$, that are entrained in the process gas. As such, the gas cleaning system requires few components.

Further objects and features of the present invention will be apparent from the following description thereof when considered along with the illustration thereof in the drawings and as defined in the claims.

BRIEF DESCRIPTION OF THE DRAWINGS

The present invention will now be described in more detail with reference to the appended drawings in which.

DESCRIPTION OF PREFERRED EMBODIMENTS

Figure 1:
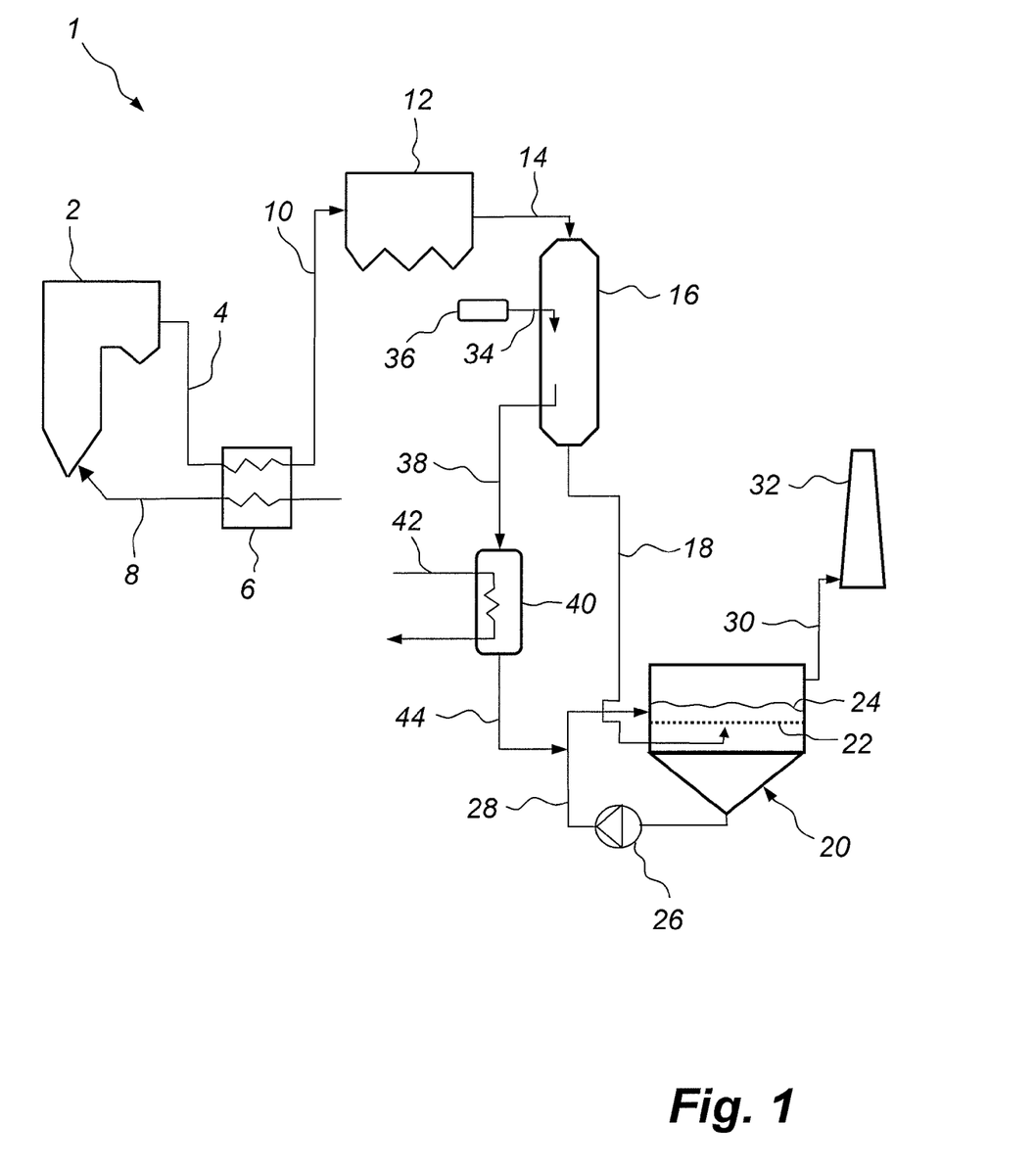
FIG. 1 is a schematic side view of a power plant with which the present invention is capable of being employed.

FIG. 1 is a schematic side view in which there is illustrated a power plant 1, as seen from the side thereof. The power plant 1 includes a boiler 2. During the combustion of a fuel, such as coal or oil, a hot process gas, often referred to by those in the industry as a flue gas, is generated in the boiler 2. This flue gas exits from the boiler 2 via a gas duct 4. The gas duct 4 in turn is connected to an air preheater 6. The air preheater 6 is designed to be operative for purposes of effecting the heating of the combustion air that is to be supplied to the boiler 2 via an air duct 8. A gas duct 10 is operative for purposes of causing the flue gas, which is generated in the boiler 2, to flow from the air preheater 6 to an electrostatic precipitator 12. The electrostatic precipitator 12 is designed to be operative for purposes of removing from the flue gas that is made to flow thereto the dust particles that are entrained in said flue gas. An example, by way of exemplification and not limitation, of an electrostatic precipitator can be found described and illustrated in U.S. Pat. No. 4,502,872, which is hereby incorporated herein by virtue of this reference thereto.

Continuing, a gas duct 14 is provided that is designed to be operative for purposes of causing the flue gas, from which most of the dust particles that are entrained therein have been removed therefrom, to flow from the electrostatic precipitator 12 to a catalytic reactor 16. The flue gas entering the catalytic reactor 16 typically is at a temperature in the range of 180-300° C. The amount of the concentration of sulphur dioxide, $SO_2$, that is entrained with the flue gas as the flue gas enters the catalytic reactor 16 typically would be in the range of 10-5000 ppm of $SO_2$. Whereas, the amount of the concentration of sulphur trioxide, $SO_3$, that is entrained with the flue gas as the flue gas enters the catalytic reactor 16 typically would be in a range of 1-50 ppm $SO_3$. As will be described in more detail hereinafter, the catalytic reactor 16 is designed to be operative for purposes of removing from the flue gas both the nitrogen oxides, NOx, and the sulphur trioxide, $SO_3$, that are entrained with the flue gas through the use of one and the same type of catalyst material. To this end, the catalytic reactor 16 typically is capable of removing about 60-95% of the nitrogen oxides, NOx, entering the catalytic reactor 16, and typically is also capable of removing about 30-90% of the sulphur trioxide, $SO_3$, entrained with the flue gas entering the catalytic reactor 16.

With further reference to FIG. 1, as illustrated therein, a gas duct 18 is provided that is designed to be operative for purposes of causing the flue gas, from which most of the nitrogen oxides, NOx, and at least some of the sulphur trioxide, $SO_3$, that has been removed therefrom, is made to flow from the catalytic reactor 16 to a bubbling bed type of wet scrubber 20. An example, by way of exemplification and not limitation, of such a bubbling bed type of wet scrubber can be found described and illustrated in WO 2005/007274, which is hereby incorporated herein by virtue of this reference thereto. In the bubbling bed type of wet scrubber 20, the flue gas is made to flow through an apertured plate 22, and then through a layer 24 of an absorption liquid that is made to flow over the apertured plate 22. Said absorption liquid preferably comprises a limestone slurry, which is designed to react with sulphur dioxide that is entrained with the flue gas in order to thereby form calcium sulphite, which can be oxidized to form gypsum, the latter being capable of being easily disposed of. Continuing with the description of the power plant 1 a pump 26 is provided that is designed to be operative for purposes of circulating the absorption liquid in the wet scrubber 20 by means of a pipe 28, which is operative to supply the absorption liquid to effect therewith the formation of the layer 24 of the absorption liquid.

Continuing, as best understood with reference to FIG. 1, a gas duct 30 is operative for purposes of causing the flue gas, from which the sulphur dioxide has been removed therefrom, to flow from the wet scrubber 20 to a stack 32, from which the flue gas from which the sulphur dioxide has been removed is released to the atmosphere.

The process of removing from the flue gas the nitrogen oxides, NOx, and the sulphur trioxide, $SO_3$, in the catalytic reactor 16 involves the use of a regenerating gas, as will be described in more detail hereinafter. Such a regenerating gas can comprise steam, which is at a suitable temperature, that is preferably at a temperature of more than 310° C. To this end, the temperature of the regenerating gas preferably is less than about 400° C., since any higher temperature would be operative to produce an increased mechanical strain on the mechanical components of the catalytic reactor 16, and might also produce a negative effect on the catalytic material of the catalytic reactor 16. Often a regenerating gas temperature of about 315 to 350° C. is suitable to achieve therewith an efficient regeneration of the catalytic material of the catalytic reactor 16.

With further reference to the illustration of the power plant 1, a first steam pipe 34 is provided that is designed to be operative for purposes of causing the regenerating gas, which is in the form of steam, to flow from a regenerating gas supply system, which is schematically illustrated in FIG. 1 as a steam tank 36, to the catalytic reactor 16. There is also provided a second steam pipe 38 that is designed to be operative for purposes of causing steam to flow from the catalytic reactor 16 to a cooler, which preferably in accordance with the present invention is in the form of a condenser 40. In addition, a cooling circuit 42 is provided that is designed to be operative for purposes of supplying a cooling medium, such as cold water, to the condenser 40. The condenser 40 is designed to be operative so that the steam is caused to be cooled to less than about 90° C., which results in most of the steam that is made to flow thereto as well as what may be entrained therein condensing. It is believed that the regenerating gas leaving the catalytic reactor 16 contains gaseous sulphur trioxide, $SO_3$, and ammonia, $NH_3$, that may react, at least partly, to form, due to the low temperature in the condenser 40, solid ammoniumbisulfate, $NH_4HSO_4$, such solid compound being easily captured in the liquid of the condenser 40. Furthermore, a condensate pipe 44 is provided that is designed to be operative for purposes of causing the condensate, which is formed in the condenser 40, to flow to the pipe 28, the latter pipe 28, as described previously hereinbefore, in turn being operative to effect the circulation of the absorption liquid of the wet scrubber 20. To this end, the condensate of the condenser 40 thus is mixed with the absorption liquid of the wet scrubber 20, such that at least some of the sulphur compounds of the condensate, such as the sulphur trioxide, $SO_3$, react with the limestone that is present in the absorption liquid to thereby form calcium compounds, such as, for example, gypsum.

Hence, and as will be described in more detail hereinafter, the catalytic reactor 16 is thus operative for purposes of effecting therewith the removal from the flue gas of both the nitrogen oxides, NOx, and the sulphur trioxide, $SO_3$, that is entrained with the flue gas. Thereafter, the sulphur trioxide is then removed from the catalytic reactor 16 by virtue of the flow through the catalytic reactor 16 of a regenerating gas. Said regenerating gas is then cooled in the condenser 40 to thereby effect the condensation of the sulphur trioxide that is entrained with the regenerating gas. The condensate that is produced in the condenser 40 is then mixed with the absorption liquid that flows in the wet scrubber 20 in order to thereby form, for example, gypsum. The wet scrubber 20 is also operative to effect the removal from the flue gas of the sulphur dioxide, $SO_2$, that is entrained with the flue gas as the flue gas flows through the catalytic reactor 16. Thus, all of the sulphur species that are entrained with the flue gas finally end up in the wet scrubber 20, from which these sulphur species may be removed in the form of gypsum.

However, the wet scrubber 20, as such, has been deemed not to be suitable for use for purposes of for removing sulphur trioxide, $SO_3$, from a flue gas. Basically, the reason for this is believed to be that the sulphur trioxide, $SO_3$, when still entrained with the flue gas upon entering the wet scrubber 20, tends to form a sulphur trioxide, $SO_3$, aerosol comprising very small aerosol droplets, which are not capable of being effectively removed in the wet scrubber 20. On the other hand, through the use of the process of the present invention, which will be described in further detail hereinafter, the sulphur trioxide, $SO_3$, is capable of being removed in the catalytic reactor 16, after which the sulphur trioxide, $SO_3$, in the form of a condensate is designed to be mixed directly with the absorption liquid that is in the wet scrubber 20, such that no sulphur trioxide, $SO_3$, aerosol is thus formed.

Figure 2:
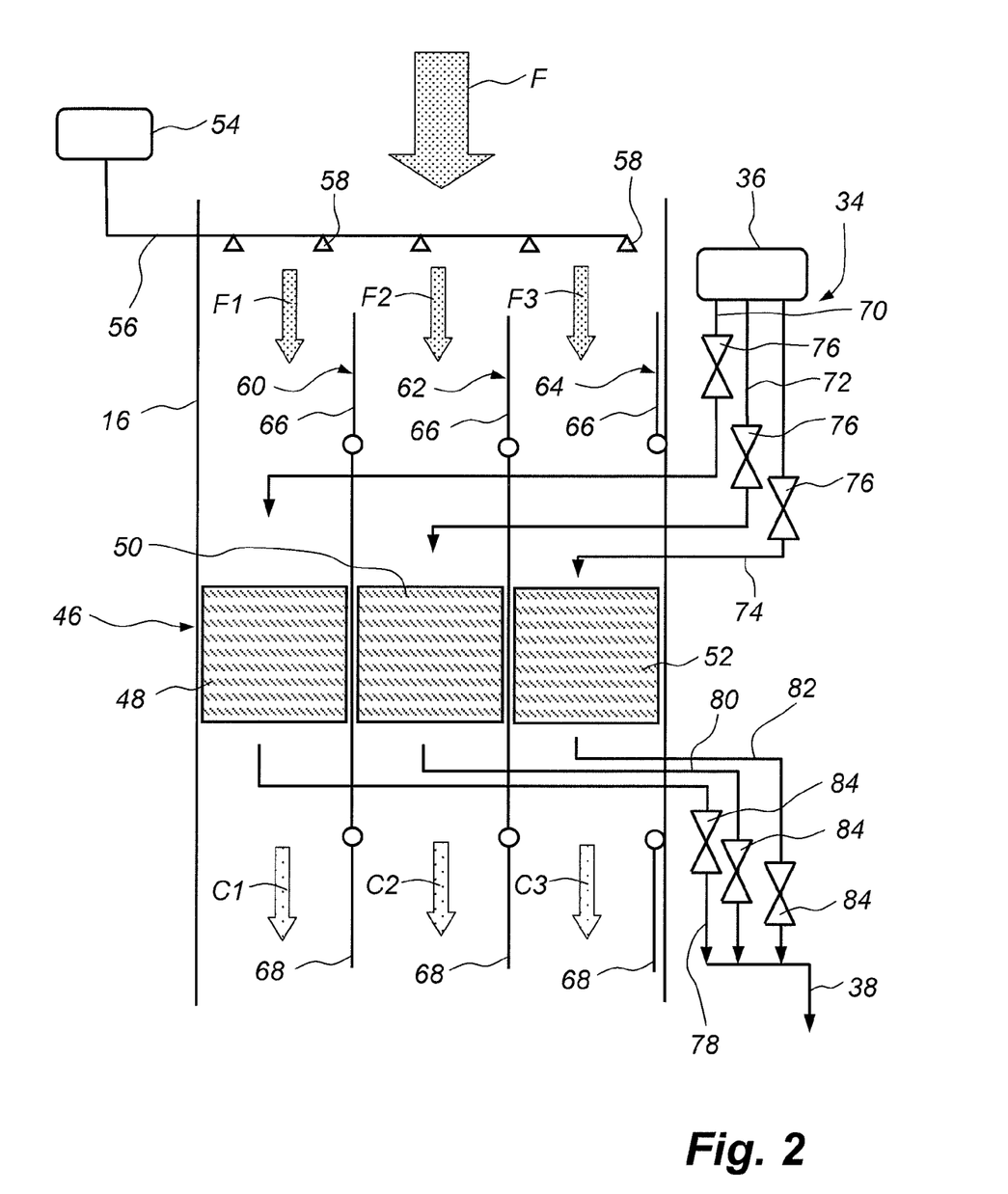
FIG. 2 is a schematic side view of a catalytic reactor that is designed to be employed with the present invention.

FIG. 2 is a schematic side view illustrating in more detail a portion of the catalytic reactor 16 that is designed to be employed with the present invention. The catalytic reactor 16, as best understood with reference to FIG. 2, includes a horizontal catalyst bed layer 46, which preferably consists of three catalyst bed segments; namely, a first catalyst bed segment 48, a second catalyst bed segment 50, and a third catalyst bed segment 52. These three catalyst bed segments 48, 50, 52 are suitably arranged in parallel relation with respect to the direction of flow of the flue gas, the latter direction being illustrated by means of the arrow denoted by the letter F in FIG. 2. The flue gas F, as described hereinbefore previously, is at a temperature that is typically in the range of 180-300° C. Each of the catalyst bed segments 48, 50, 52 embodies a catalytically active material, such as, by way of exemplification and not limitation, vanadium pentoxide, $V_2O_5$, and/or tungsten trioxide, $WO_3$. Such a catalytically active material is designed to be supported on a carrier structure, such as, by way of exemplification and not limitation, a ceramic honeycomb or a plate structure, such as, for example, a titanium dioxide structure. Such titanium dioxide structures are known in the prior art technologies wherein they have been employed in selective catalytic reduction (SCR) devices for purposes of effecting therewith the removal of nitrogen oxides.

Continuing, a source of ammonia, schematically illustrated in FIG. 2 in the form of an ammonia tank 54, is designed to be operative for purposes of supplying gaseous ammonia via a pipe system 56 preferably to a plurality of nozzles 58. In turn, the nozzles 58 are designed to be operative to cause the ammonia to be thoroughly mixed with the flue gas F. As such, thereafter, when passing through the catalyst bed segments 48, 50, 52 the nitrogen oxides are reduced through the interaction thereof with the ammonia thereby resulting in the production of nitrogen gas in accordance with principles that are well-known to those skilled in the art of the selective catalytic reduction (SCR) of nitrogen oxides. An example of such a SCR principle, and the reactions between the nitrogen oxides and ammonia that result from the application of such a principle, can be found described and illustrated in U.S. Pat. No. 5,555,849, the teachings of which are hereby incorporated herein by virtue of this reference thereto. As an alternative to the use of ammonia it is equally possible to utilize urea in lieu of ammonia.

Each of the catalyst bed segments 48, 50, 52 is designed to be provided with a closing device 60, 62, 64, respectively. Each such closing device 60, 62, 64, in accordance with the present invention, comprises an inlet damper 66 and an outlet damper 68. Each of the closing devices 60, 62, 64 are designed to be operative to effect therewith the isolation of the respective one of the catalyst bed segments 48, 50, 52 from the flow of the flue gas F. As illustrated in FIG. 2, all of the closing devices 60, 62, 64 are depicted as being in an open position, and the flow of the flue gas F is, as such, divided into three substantially equal partial flows, which are denoted in FIG. 2 as F1, F2, and F3, respectively that flow through the respective one of the catalyst bed segments 48, 50, 52 in a vertical direction as viewed with reference to FIG. 2.

As they flow through the respective catalyst bed segments 48, 50, 52, the nitrogen oxides are reduced through the interaction thereof with the ammonia that is supplied thereto, as has been described hereinbefore previously. Furthermore, a substantial fraction, typically on the order of 30-90%, of the sulphur trioxide, $SO_3$, content of the flue gas F is deposited on to the catalytic material that the catalyst bed segments 48, 50, 52 each embody. The reason that such a deposition occurs is that the temperature of the flue gas F is comparatively low, which in turn results in the condensation of at least a portion of the sulphur trioxide, $SO_3$. Continuing, the catalyst material embodied by each of the catalyst bed segments 48, 50, 52 consists of a large specific area, which is typically defined as being a so-called BET-area, that as such is operative to provide numerous active sites at which it is possible for the reaction between the nitrogen oxides and the ammonia to occur. Typically, such a BET-area, when measured in accordance with the provisions of ASTM C1274-00 (2006), would be at least 20 $m^2/g$, and preferably at least 50 $m^2/g$. Such a large specific area is thus operative to provide a suitable surface at which the condensation of the sulphur trioxide, $SO_3$, can take place. Hence, the catalyst bed segments 48, 50, 52 are thus operative to reduce the nitrogen oxides in accordance with principles of selective catalytic reduction (SCR), and to cause the capture of the sulphur trioxide, $SO_3$, as a consequence of the occurrence of condensation reactions. As such, the flue gas that leaves the catalyst bed segments 48, 50, 52, in the form of the three partial flows that are denoted in FIG. 2 as C1, C2, and C3, is substantially clean, insofar as the amount of the concentration of the nitrogen oxides and the sulphur trioxide, $SO_3$, entrained therewith is concerned.

After the operation thereof for a sufficient period of time, the catalyst bed segments 48, 50, 52 will have captured such an amount of sulphur trioxide, $SO_3$, that the selective catalytic reduction of nitrogen oxides will be negatively effected thereby. For this reason there is provided the steam tank 36. To this end, the first steam pipe 34, which has been described hereinbefore previously with reference to the power plant 1 that is illustrated in FIG. 1 is comprised of three separate pipes 70, 72, 74. Each of these pipes 70, 72, 74 is suitably provided with a steam valve 76. Furthermore, the second steam pipe 38, which has been described hereinbefore previously with reference to the power plant 1 that is illustrated in FIG. 1, is connected to three separate pipes 78, 80, 82, each of which is suitably provided with a steam valve 84. In accordance with the illustration thereof in FIG. 2, all of the steam valves 76, 84 are depicted therein as being in a closed position.

Figure 3:
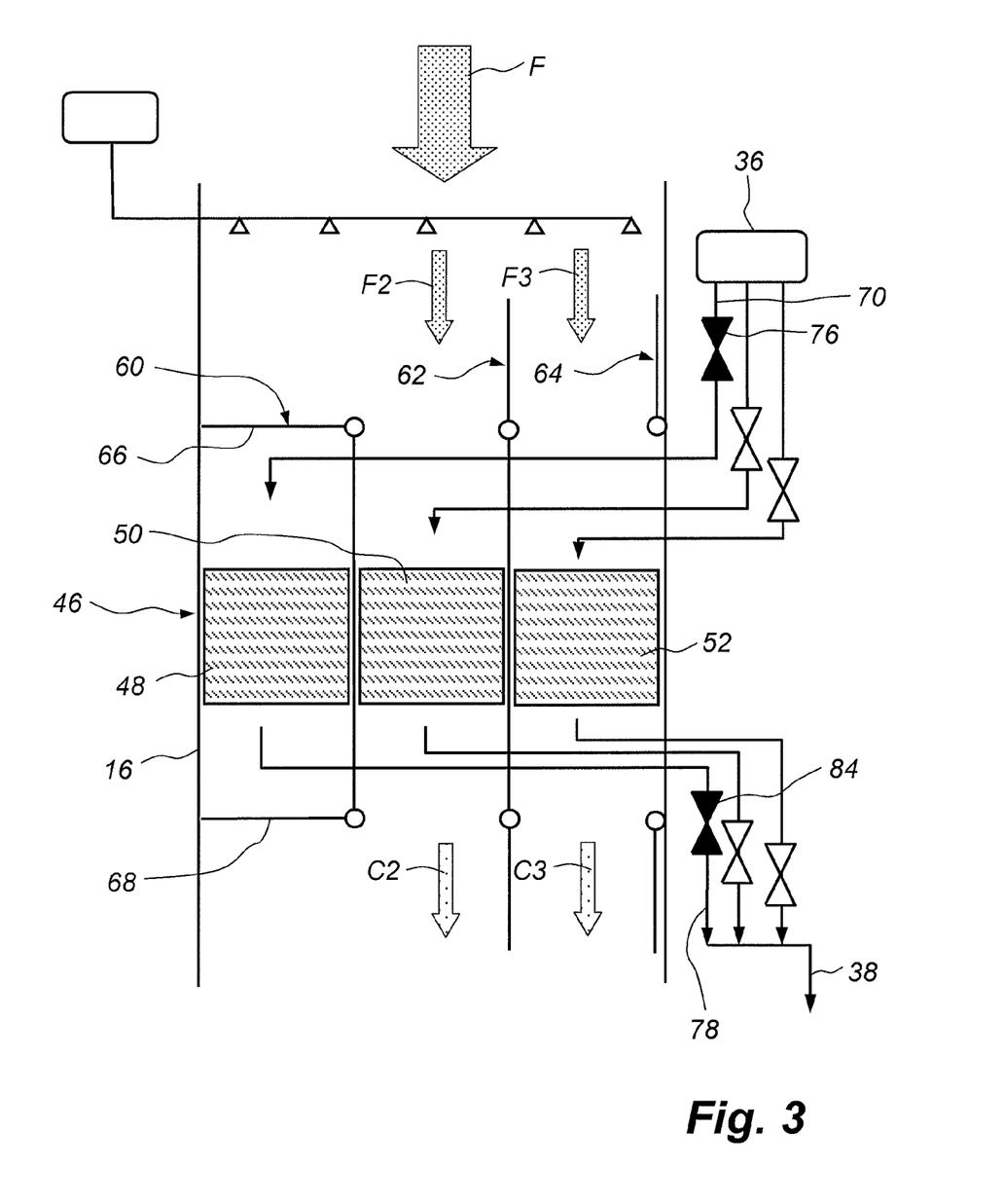
FIG. 3 is a schematic side view of the catalytic reactor of FIG. 2 when the latter is being operated in a cleaning mode.

FIG. 3 is a side view, similar to that of FIG. 2, and depicts the catalytic reactor 16 as being in a cleaning mode of operation. When in such a cleaning mode the inlet damper 66 and the outlet damper 68 of the closing device 60 are each in a closed position, such as to thereby effect the isolation of the first bed segment 48 from the flow of the flue gas F. As a result thereof, the entire flow of the flue gas F flows through the second and third bed segments 50, 52 in the form of the flows of flue gas, which are denoted as F2 and F3 in FIG. 3. With further reference to FIG. 3, the valve 76 of the pipe 70 is depicted therein as being in an open position, and so is the valve 84 of the pipe 78 depicted therein as being in an open position. Thus, as a result of this steam, at a temperature of at least 310° C., is caused to flow from the steam tank 36, via the pipe 70 to the first bed segment 48 and therethrough. By virtue of the high temperature of such steam the sulphur trioxide, $SO_3$, that has been condensed on to the catalyst material of the first catalyst bed segment 48 is caused to evaporate. Thereafter, the steam together with the sulphur trioxide, $SO_3$, that has been evaporated is evacuated via the pipes 78 and 38 from the first bed segment 48 and is then transmitted to the condenser 40, to which reference has been made hereinbefore previously in connection with the description of the power plant 1 that is illustrated in FIG. 1. Thus, the steam from the steam tank 36 is operative to thermally regenerate the catalytic material that the first bed segment 48 embodies in order to thereby effect a restoration of its capability of reducing of the nitrogen oxides, NOx, by virtue of the removal of the sulphur trioxide, $SO_3$, from the catalytic material. As described hereinbefore previously with reference to the description of the power plant 1 that is illustrated in FIG. 1, the steam with which the sulphur trioxide, $SO_3$, is entrained is cooled in the condenser 40 whereby a condensate is formed after which such condensate is fed to a sulphur trioxide, $SO_3$, removal device in the preferred form of the wet scrubber 20 in accordance with the present invention.

As will be best understood from a reference to FIG. 3, the second and third catalyst bed segments 50, 52, in accordance with the illustration thereof in FIG. 3, remain in operation and are thus operative to reduce the content of nitrogen oxides of the entire flow of the flue gas F. After the first catalyst bed segment 48 has been regenerated in the manner that has been described in the previous paragraph, the valve 76 of the pipe 70 and the valve 84 of the pipe 78 are both closed, and concomitantly the closing device 60 is opened. Next, the second catalyst bed segment 50 can then be regenerated by being isolated from the flow of flue gas F by virtue of the operation of the closing device 62. Accordingly, the cleaning of any one of the catalyst bed segments 48, 50, 52 can be accomplished while the catalytic reactor 16 is still on-line and remains in an operational mode. It will be appreciated that without departing from the essence of the present invention the total number of catalyst bed segments can be designed such as to ensure that those catalyst bed segments that remain in operation are sufficient to handle the entire flow of the flue gas F while one or more of the catalyst bed segments have been isolated from the flow of the flue gas F for the purpose of enabling the catalyst bed segments, which have been isolated, to undergo a cleaning sequence in accordance with what has been described hereinbefore with reference to the structure that is illustrated in FIG. 3.

Figure 4:
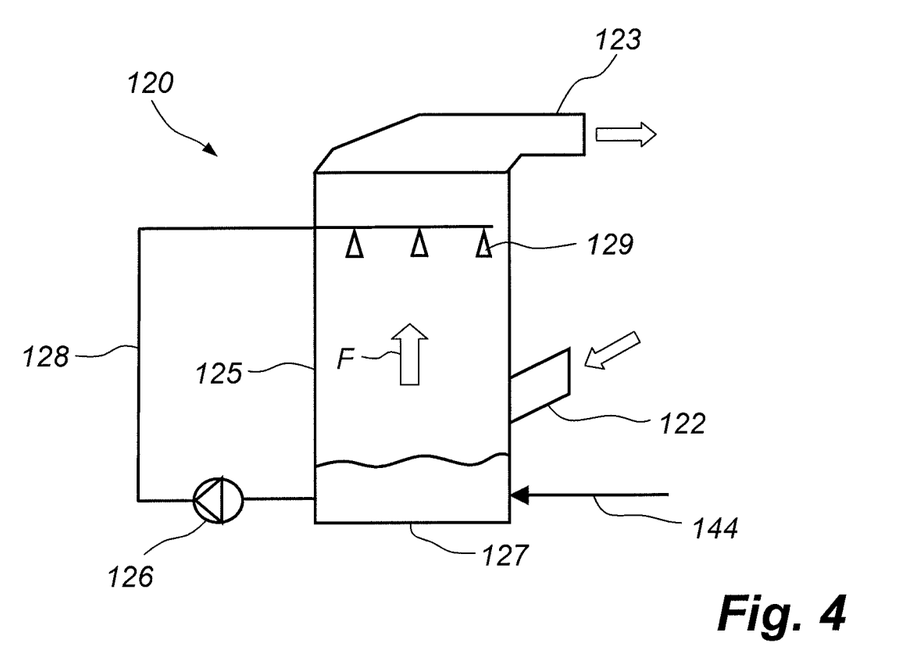
FIG. 4 is a schematic side view of a wet scrubber that is capable of being employed with the present invention.

FIG. 4 illustrates an alternative embodiment of a sulphur trioxide, $SO_3$, removal device that is in the form of a wet scrubber tower 120. A wet scrubber tower, such as, by way of exemplification, the wet scrubber tower 120 that is depicted in FIG. 4, is previously known from applications wherein sulphur dioxide, $SO_2$, is designed to be removed from a flue gas. In this regard, reference may be had, by way of exemplification and not limitation, to, for example, EP 162 536, the teachings of which are hereby incorporated herein by virtue of this reference thereto. The wet scrubber tower 120 includes a gas inlet 122 and a gas outlet 123. The flue gas enters the gas inlet 122, via the duct 18 to which reference has been had hereinbefore previously in connection with the description of the power plant 1 that is illustrated in FIG. 1, and is then caused to flow vertically upwards, as viewed with reference to FIG. 4, through a cylindrical portion 125 of the wet scrubber tower 120, in the manner that is illustrated by means of the arrow that is denoted by the letter F in FIG. 4. The lower portion 127 of the wet scrubber tower 120, as best understood with reference to FIG. 4, is shaped in the form of a tank, which contains a limestone based absorption medium that preferably is in the form of a liquid slurry. Continuing, a pump 126 is provided for purposes of effecting therewith the pumping of the absorption liquid, via a pipe 128, to a number of nozzles 129. The nozzles 129 in turn are operative to inject said liquid slurry in to the flue gas F, in order to effect therewith the removal of sulphur dioxide, $SO_2$, from the flue gas F. Accordingly, a flue gas that is substantially pure in nature exits from the outlet 123 and is thus made to flow therefrom to the stack. Just as in the case of the wet scrubber 20, which has been described hereinbefore previously in connection with the description of the power plant 1 that is illustrated in FIG. 1, the sulphur dioxide, $SO_2$, that is removed from the flue gas forms gypsum, which can easily be readily disposed of.

The condensate that is formed in the condenser 40, to which reference has been made hereinbefore previously in connection with the description of the power plant 1 that is illustrated in FIG. 1, may be added without departing from the essence of the present invention to the lower portion 127 of the wet scrubber tower 120 via a pipe 144. If this is done, the condensate in the lower portion 127 of the wet scrubber tower 120 is then mixed with the liquid slurry, such that the sulphur trioxide, $SO_3$, in the condensate forms gypsum, in the manner that has been described hereinbefore previously in connection with the description of the power plant 1 that is illustrated in FIG. 1. Accordingly, the wet scrubber tower 120 is thus operative for purposes of effecting the removal of the sulphur dioxide, $SO_2$, from the flue gas F that has been made to flow through the catalytic reactor 16, and concomitantly is operative to effect the capture of the sulphur trioxide, $SO_3$, that has been removed from the catalytic reactor 16 by the regenerating gas, i.e., the steam, that is made to flow through the catalytic reactor 16.

Figure 5:
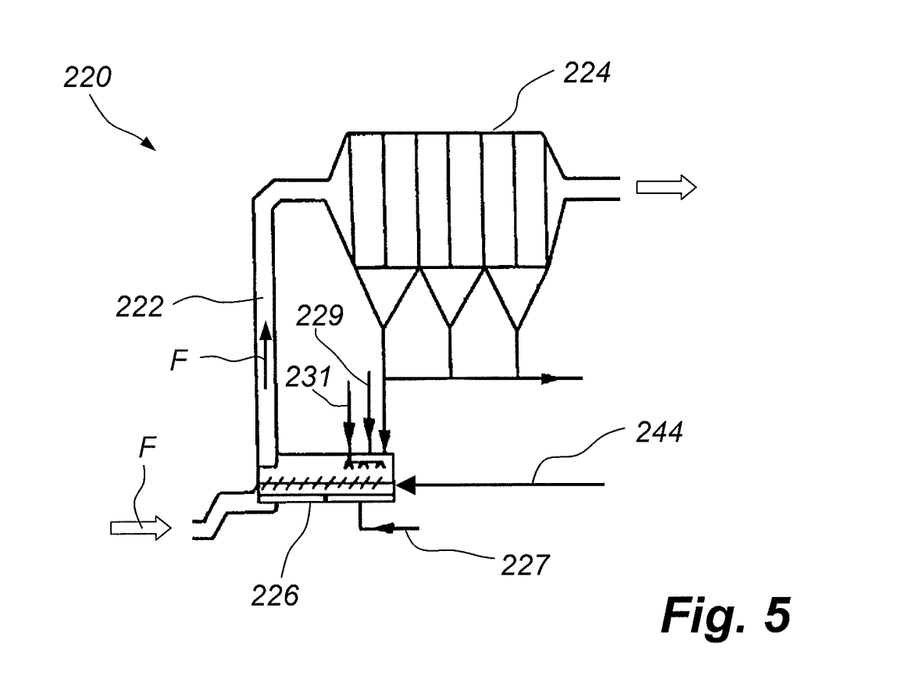
FIG. 5 is a schematic side view of a dry scrubber that is capable of being employed with the present invention.

In FIG. 5 there is illustrated yet a further alternative embodiment of a sulphur trioxide, $SO_3$, removal device, which as illustrated therein is in the form of a dry scrubber 220. A dry scrubber, such as, by way of exemplification, the dry scrubber 220 that is depicted in FIG. 5, is previously known from applications wherein sulphur dioxide, $SO_2$, is designed to be removed from a flue gas. In this regard, reference may be had, by way of exemplification and not limitation, to, for example, WO 2004/026443, the teachings of which are hereby incorporated herein by virtue of this reference thereto. Continuing, the dry scrubber 220 includes a contact reactor 222 in which the flue gas F is brought into contact with a dry, but moistened, absorption medium that preferably is in the form of a dry powder. Such a dry powder could, by way of exemplification, consist of a mixture of hydrated lime and the reaction products that are produced during the reaction between such hydrated lime and the sulphur dioxide, $SO_2$, that is entrained in the flue gas F. This dry powder is then in turn collected in a fabric filter, i.e., a textile filter, which preferably is in the form of a bag house 224. An example of such a bag house can be found described and illustrated, by way of exemplification and not limitation, in U.S. Pat. No. 4,336,035, the teachings of which are hereby incorporated herein by virtue of this reference thereto. Continuing, a first portion of such dry powder that is so collected in the bag house 224 preferably is removed for purposes of the disposal thereof. Whereas, a second portion of such dry powder is recirculated to a mixer 226. It is in the mixer 226, the latter consisting of a fluidised bed, which is supplied with compressed air via a pipe 227, that the recirculated dry powder is then mixed with both fresh hydrated lime that is supplied via a pipe 229 and water that is supplied via a pipe 231. From the mixer 226, the mixture that has been formed therein, that is, the absorption medium, is made to flow to the contact reactor 222. With further reference to FIG. 5, as best understood with reference thereto, the condensate from the condenser 40, to which reference has been had hereinbefore previously with regard to the power plant 1 that is illustrated in FIG. 1, is supplied to the mixer 226 via a pipe 244. In the mixer 226, the sulphur trioxide, $SO_3$, that is entrained with the condensate that is made to flow thereto reacts with the hydrated lime thereby forming gypsum. To this end, the dry scrubber 220 is thus operative to effect the removal of the sulphur dioxide from the flue gas F that has been made to flow through the catalytic reactor 16, and concomitantly is operative to effect the capture of the sulphur trioxide, $SO_3$, that has been removed from the catalytic reactor 16 by the regenerating gas, i.e., the steam, that is made to flow through the catalytic reactor 16.

It will be appreciated that without departing from the essence of the present invention numerous variants of the embodiments described above are possible within the scope of the appended claims.

For example, by way of exemplification and not limitation, it has been described hereinbefore previously that the gas utilized for regenerating the catalyst bed segments preferably is steam at a temperature of at least 310° C. However, it will be appreciated that other gases can equally well also be utilized for purposes of effecting the regeneration of the catalyst bed segments without departing from the essence of the present invention. For instance, air, nitrogen gas, or combustion gas from a natural gas or a similarly clean fuel can equally well also be utilized as a regenerating gas without departing from the essence of the present invention. In accordance with a further alternative of the present invention, it is possible without departing from the essence of the present invention to utilize a flue gas as the regenerating gas, preferably a cleaned flue gas from which most of the particulates, nitrogen oxides and sulphur species have previously been removed. Further to this point, such flue gases are preferably also heated to a temperature of at least 310° C. to thereby enable an efficient and quick regeneration of the catalyst bed segments to be had therewith. Since the regeneration of the catalyst bed segments is based on thermally removing the sulphur trioxide, $SO_3$, therefrom, the regenerating gas as such does not need to embody any hydrogen gas. To this end, the regenerating gas in fact preferably is substantially hydrogen-free, i.e., contains less than about 500 ppm of hydrogen gas, since a substantial amount of hydrogen gas in the regenerating gas would potentially pose possible risks of fire and explosion.

It has been described previously hereinbefore that alternatively a wet scrubber 20, a wet scrubber tower 120, or a dry scrubber 220 may be utilized without departing from the essence of the present invention for purposes of effecting therewith the removal of sulphur dioxide, $SO_2$, from the flue gas and for purposes of effecting the capture of sulphur trioxide, $SO_3$, that has been removed from the catalytic reactor 16 by virtue of the passage therethrough of the regenerating gas. It will be appreciated that other devices may equally well also be utilized as sulphur trioxide, $SO_3$, removal devices without departing from the essence of the present invention, such as, by way of exemplification and not limitation, electrostatic precipitators and fabric filters that do not necessarily constitute a part of a dry scrubber. A still further alternative is to utilize a spray drying absorber for purposes of effecting therewith the removal of sulphur dioxide, $SO_2$, from the flue gas and for purposes of effecting the capture of sulphur trioxide, $SO_3$, that has been removed from the catalytic reactor 16 by virtue of the passage therethrough of the regenerating gas. In this regard, reference may be had, by way of exemplification and not limitation, to, for example, U.S. Pat. No. 4,755,366, the teachings of which are hereby incorporated herein by virtue of this reference thereto. In such a spray drying absorber the condensate from the condenser, containing the sulphur trioxide, $SO_3$, could be mixed with an aqueous suspension that is then supplied to an atomiser of the spray drying absorber.

The sulphur trioxide, $SO_3$, removal device may also, as yet another alternative, be in the form, without departing from the essence of the present invention, of a separate unit, that in no way has anything to do with the removal of sulphur dioxide, $SO_2$, from the flue gas.

The catalytic reactor 16 has been described in accordance with the preferred embodiment of the present invention as consisting of three parallel catalyst bed segments 48, 50, 52. However, it will be appreciated that without departing from the essence of the present invention the catalytic reactor 16 may equally well consist of any other number of catalyst bed segments arranged in parallel relation to each other, as long as a sufficient number of bed segments are provided, which are capable of remaining in operation while the other ones of the catalyst bed segments are regenerated by virtue of the passage therethrough of the regenerating gas. Furthermore, the catalytic reactor 16 has been illustrated in accordance with the preferred embodiment of the present invention as consisting of a single catalyst bed layer 46. However, it will be appreciated that a catalytic reactor may equally well also be designed with several, such as, by way of exemplification and not limitation, 2-5 catalyst bed layers arranged in series, without departing from the essence of the present invention.

It has been described hereinbefore, without being limited thereto, that the condensate from the condenser 40 comprises sulphur trioxide, $SO_3$. It is possible that other compounds may be formed, in addition to, or as alternative to, sulphur trioxide, during the regeneration of the catalytic reactor 16. Examples of such compounds which may be contained in the condensate include ammonium(bi)sulphate and sulphuric acid.

Hereinbefore it has previously been described, with reference to FIGS. 2 and 3, how closing devices can be arranged in accordance with the present invention so as to be operative for the purpose of isolating a catalyst bed segment from the flow therethrough of the flue gas. It will be appreciated, however, that other mechanical arrangements could equally well be utilized without departing from the essence of the present invention for purposes of effecting such isolation. One such alternative arrangement is described and illustrated in U.S. Pat. No. 6,340,002, the teachings of which are hereby incorporated herein by virtue of this reference thereto.

Above it has been described that the catalytic reactor 16 is located downstream of the air-preheater 6 and downstream of the electrostatic precipitator 12. It will be appreciated that other arrangements could be utilized as well. For example, the catalytic reactor could be located immediately downstream of the air-preheater, with a dust removal device, such as an electrostatic precipitator, located downstream of the catalytic reactor. Furthermore, the catalytic reactor could also be located immediately downstream of the boiler, with the dust removal device and the air preheater being located downstream of the catalytic reactor.

While the present invention has been described herein with reference to a number of preferred embodiments, it will be appreciated by those skilled in the art that various changes may be made thereto and/or equivalents may be substituted for various ones of the elements thereof without departing from the essence of the present invention. In addition, many modifications may be made to the present invention in order to adapt the present invention for use in a particular situation without departing from the essence of the present invention. Therefore, it is intended that the present invention not be limited to the particular embodiments disclosed herein as the best mode contemplated for carrying out the present invention, but that the present invention shall be considered to include all embodiments of the present invention that are deemed to fall within the scope of the appended claims in this application. Moreover, the use of the terms first, second, etc. are not to be considered to denote any order or importance, but rather such terms first, second, etc., as employed herein, are to be considered as being employed simply for the purpose of distinguishing one element from another.

Thus, by way of a summary, a catalytic reactor 16 for removing nitrogen oxides, NOx, from a process gas consists of at least two catalyst bed segments 48, 50, 52, each of which is provided with a closing device 60, 62, 64. The catalytic reactor 16 is designed to be operative for purposes of causing the process gas F to flow through a first bed segment 48. Moreover, the process gas F is at a first temperature at which sulphur trioxide, $SO_3$, which is entrained in the hot process gas, is at least partially precipitated on to the catalytic material that the first catalyst bed segment 48 embodies. Periodically the closing device 60 is designed to be operated in order to thereby effect therewith the isolation of the first bed segment 48 from the flow therethrough of the process gas F. In addition, a regeneration system 34, 36, 38 is provided that is designed to be operative for purposes of causing a regenerating gas to flow through the first bed segment 48. Furthermore, a sulphur trioxide, $SO_3$, removal device 20, which is separate from said catalytic reactor 16, is designed to be operative for purposes of effecting therewith the removal of the sulphur trioxide, $SO_3$, from said regenerating gas.

The invention claimed is:

1. A method of removing, at least partially, nitrogen oxides from a hot process gas through the use of a catalytic reactor, said method comprising:
   causing said hot process gas with an ammonia or urea additive to flow through at least a first catalyst bed segment of at least two catalyst bed segments of said catalytic reactor with catalytic material of vanadium pentoxide, tungsten trioxide or a combination thereof, said hot process gas being at a first temperature in the range of 180-300° C. at which sulphur trioxide entrained with the hot process gas is at least partially precipitated out as solid ammoniumbisulfate onto said catalytic material of the first catalyst bed segment;
   periodically operating a closing device of said first catalyst bed segment in order to thereby isolate said first catalyst bed segment from the flow of hot process gas, while at least a second catalyst bed segment of said at least two catalyst bed segments remains operative for purposes of removal of sulphur trioxide and nitrogen oxides from said hot process gas;
   regenerating using a regenerating gas said catalytic material of said first catalyst bed segment at a second temperature less than 400° C. when said first catalyst bed segment is isolated from the flow of the hot process gas; and
   passing said regenerating gas, after said regenerating gas has flowed through said first catalyst bed segment, with said hot process gas through a sulphur trioxide removal device, said sulphur trioxide removal device being separate from said catalytic reactor.

2. The method as claimed in claim 1, wherein said regenerating gas is at a second temperature, said second temperature being higher than said first temperature.

3. The method as claimed in claim 2, wherein said first temperature is in the range of 180-300° C., and said second temperature is at least 310° C.

4. The method as claimed in claim 1, wherein said sulphur trioxide removal device is a sulphur trioxide removal device selected from the group of devices consisting of wet scrubbers, dry scrubbers, fabric filters, and electrostatic precipitators.

5. The method as claimed in claim 4, wherein said sulphur trioxide removal device is located at a point downstream of said catalytic reactor with respect to the direction of flow of the hot process gas, and said sulphur trioxide removal device is operative for purposes of removing the sulphur species that are entrained in said hot process gas and in said regenerating gas.

6. The method as claimed in claim 1, wherein said regenerating gas is cooled after said regenerating gas has flowed through said first catalyst bed segment and before said regenerating gas is made to flow through said sulphur trioxide removal device.

7. The method as claimed in claim 1, wherein said regenerating gas, after said regenerating gas has been made to flow through said first catalyst bed segment, is made to flow through a sulphur trioxide removal device wherein at least a portion of said regenerating gas is mixed with an absorption medium that is circulated in said sulphur trioxide removal device for the purpose of effecting the removal of the sulphur dioxide that is entrained in said hot process gas.

8. The method as claimed in claim 1, wherein said regenerating gas is a regenerating gas that is selected from the group of gases consisting of steam, air, nitrogen, flue gas, and mixtures thereof.

9. The method as claimed in claim 1, wherein a chemical, which is selected from the group of chemicals consisting of ammonia and urea, is supplied to the catalytic reactor for the purpose of effecting therewith the selective catalytic reduction of the nitrogen oxides that are removed from the hot process gas.

* * * * *